United States Patent
Woerner et al.

(10) Patent No.: US 12,553,536 B2
(45) Date of Patent: Feb. 17, 2026

(54) ELECTROMAGNETIC ACTUATOR, IN PARTICULAR ELECTROMAGNETIC SWITCHING OR VALVE DEVICE

(71) Applicant: Knorr-Bremse Systeme Fuer Nutzfahrzeuge GmbH, Munich (DE)

(72) Inventors: Ralf Woerner, Tiefenbronn (DE); Friedbert Roether, Cleebronn (DE); Benjamin Jensen, Grossbottwar (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 0 days.

(21) Appl. No.: 18/715,535

(22) PCT Filed: Dec. 14, 2022

(86) PCT No.: PCT/EP2022/085901
§ 371 (c)(1),
(2) Date: May 31, 2024

(87) PCT Pub. No.: WO2023/111043
PCT Pub. Date: Jun. 22, 2023

(65) Prior Publication Data
US 2025/0035231 A1    Jan. 30, 2025

(51) Int. Cl.
*F16K 31/06*    (2006.01)
*H01F 7/08*    (2006.01)
*H01F 7/14*    (2006.01)

(52) U.S. Cl.
CPC ......... *F16K 31/0682* (2013.01); *H01F 7/081* (2013.01); *H01F 7/14* (2013.01); *H01F 2007/086* (2013.01)

(58) Field of Classification Search
CPC ......... F16K 31/0682; H01F 7/081; H01F 7/14
See application file for complete search history.

(56) References Cited

U.S. PATENT DOCUMENTS 3,739,311 A * 6/1973 Garbark ............... H01F 7/08
335/297
4,250,924 A * 2/1981 Sakakibara ......... F16K 31/0682
137/868

(Continued)

FOREIGN PATENT DOCUMENTS

CN    206471294 U    9/2017
DE    102009041853 A1    3/2011

(Continued)

OTHER PUBLICATIONS

International Search Report for PCT/EP2022/085901, Issued Mar. 22, 2023.

*Primary Examiner* — Umashankar Venkatesan
(74) *Attorney, Agent, or Firm* — NORTON ROSE FULBRIGHT US LLP

(57) ABSTRACT

An electromagnetic-actuator (EA) including a coil-element (CE) having a coil-core (CC)/coil arranged about the CC-circumference. The CC has a symmetrical first-region (FR) having an axis-of-symmetry (AOS), the CC being surrounded by the coil, and a movable-magnetic-armature-body (MM AB) as a movable-actuator-element (MAE) interacts with the CE to produce an AB activation-movement, and is supported in the actuator by a bearing-device (BD) and movable from a first/second-position by activating the CE. The BD is radially-offset to the CC AOS, and the AB extends from the BD radially over the CC from a first/second-side of the CC, which has a second-region (SR) extending radially beyond the FR and is on second-side (SS) of the CC between the coil/AB in the direction of AOS such that an air-gap between CC/AB in direction of the AOS is smaller on the SS of the CC than on first-side when the AB is in first-position.

15 Claims, 2 Drawing Sheets

(56) References Cited

U.S. PATENT DOCUMENTS

| | | | |
|---|---|---|---|
| 4,397,443 A * | 8/1983 | Watanabe | F16K 31/0682 |
| | | | 251/129.15 |
| 7,679,476 B2 * | 3/2010 | Kubono | H01H 51/2227 |
| | | | 335/85 |
| 8,502,627 B1 | 8/2013 | Ahmad et al. | |
| 10,488,173 B2 * | 11/2019 | Sugawara | H01F 7/16 |
| 11,276,540 B2 * | 3/2022 | Gutmann | H01H 50/643 |
| 11,719,356 B2 * | 8/2023 | Deeg | B60T 8/3615 |
| | | | 137/514 |
| 2020/0027636 A1 | 1/2020 | Kobayashi et al. | |

FOREIGN PATENT DOCUMENTS

| | | |
|---|---|---|
| DE | 102014115206 B3 | 2/2016 |
| DE | 102014115207 A1 | 4/2016 |
| DE | 102016105532 A1 | 9/2017 |
| DE | 102018123997 A1 | 4/2020 |
| EP | 2701173 B1 | 1/2020 |
| WO | 2018121901 A1 | 7/2018 |

\* cited by examiner

ELECTROMAGNETIC ACTUATOR, IN PARTICULAR ELECTROMAGNETIC SWITCHING OR VALVE DEVICE

FIELD OF THE INVENTION

The present invention relates to an electromagnetic actuator comprising a coil element, which has a coil core and a coil arranged radially around the coil core, and comprising a movable magnetic armature body as an actuator element, which interacts with the coil element to produce a movement, to be activated, of the armature body, is supported in the actuator on one side by a bearing device, and can be moved from a first position into a second position by activating the coil element.

BACKGROUND INFORMATION

Electromagnetic actuators of this kind are understood, for example, in the form of electromagnetic switching or valve devices, e.g. in the form of an electromagnetic relay or solenoid valve. Solenoid valves, in the form of tilting armature valves for instance, are used, for example, as control valves for air pressure regulation, in a vehicle for instance, e.g. a utility vehicle or bus for passenger transport. For example, a brake system for a vehicle having an electronic service brake system comprises at least one control valve for pressure regulation.

An electromagnetic actuator in the form of a tilting armature valve is discussed in DE 10 2016 105 532 A1, for example. The tilting armature valve has a coil element with a coil core and a coil arranged circumferentially around the coil core, as well as an armature, which is supported at one end of the armature by a bearing, wherein the armature can be moved from a first position into a second position, in particular, by supplying the coil with current. In addition, a valve seat with an outlet and an inlet for a fluid are provided, wherein the outlet can be closed in a fluidtight manner by a sealing element in the first position of the armature, and the outlet is exposed in the second position of the armature. According to one embodiment, a spring is provided for pressing the armature against the coil element or a housing of the tilting armature valve.

Other configurations of solenoid valve are also understood, e.g. those discussed in DE 10 2014 115 207 A1, DE 10 2018 123 997 A1, or DE 10 2014 115 206 B3.

In the case of electromagnetic actuators, especially switching or valve devices, such as the solenoid valve configurations mentioned by way of example, the magnet coils and the magnet cores (coil cores) that act to intensify the magnetic force are generally of round or cylindrical cross section, for example, on account of the positive material/surface area ratio. Uniform distribution of the magnetic flux within the magnet core is thereby achieved. However, the known coil core shape has the effect that the transition of the magnetic flux from the magnet core into the yoke is often nonuniform. When using yoke armature magnets (e.g. tilting armature magnets), however, this means that some of the effective magnetic force also acts in the region of the bearing of the tilting armature or even behind the bearing axis of rotation. This reduces or even weakens the effective magnetic force.

SUMMARY OF THE INVENTION

It is an underlying object of the present invention to specify an electromagnetic actuator of the type stated at the outset in which it is possible to increase the magnetic force that can be used for the actuator element movement which is to be activated.

The invention relates to an electromagnetic actuator of the type stated at the outset in accordance with the appended patent claims. Advantageous embodiments and developments of the invention are specified in the dependent claims and the following description.

In particular, one aspect of the present invention relates to an electromagnetic actuator comprising a coil element, which has at least one coil core and a coil arranged circumferentially around the coil core, wherein the coil core has a rotationally symmetrical first region, which has an axis of symmetry and in which the coil core is surrounded circumferentially by the coil. The actuator furthermore has a movable magnetic armature body as a movable actuator element, which interacts with the coil element to produce a movement, to be activated, of the armature body, is supported in the actuator on one side by a bearing device, and can be moved from a first position into a second position by activating the coil element, wherein the bearing device is arranged radially offset relative to the axis of symmetry of the coil core, and the armature body extends from the bearing device radially over the coil core from a first side to a second side of the coil core. In addition, the coil core has a second region, which extends radially beyond the first region and which is arranged on the second side of the coil core between the coil and the armature body in the direction of axis of symmetry, such that an air gap between the coil core and the armature body in the direction of the axis of symmetry is smaller on the second side of the coil core than on the first side when the armature body is in the first position.

The invention makes it possible, in the case of an electromagnetic actuator of the type in question, to increase the magnetic force that can be used for the actuator element movement which is to be activated, this increase being achieved by using selective positioning and configuration of the magnetic transition between the coil core and the armature body (yoke), on the one hand, to weaken the magnetic flux in the direction of the bearing, whereas the usable magnetic force at the other end of the armature body is increased. This also has a positive effect on the torque acting on the armature body as a result of the magnetic force, said torque being increased on the second side of the coil core, remote from the bearing.

In principle, this selective positioning and configuration of the magnetic transition between the coil core and the armature body can be used with all electromagnetic actuators in combination with yoke armature magnets, e.g. solenoid valve and switching devices with tilting armatures, that are supported at one end. It is thereby possible to achieve optimization of electromagnetic actuators with yoke armature magnets (e.g. tilting armature magnets) as a drive for relays, lifting armatures and solenoid valves, for example.

According to one embodiment of the electromagnetic actuator, when viewed in cross section along the axis of symmetry of the coil core, the second region of the coil core extends in the manner of an offset, starting from the first region. In particular, the end geometry of the coil core in the second region is provided with an additional offset, advantageously to a maximum possible diameter close to the outer circumference of the coil winding. As a result of an additional offset of this kind, the field lines of the magnetic field are directed to a greater extent in the direction of the second side of the coil core, which, on the one hand, increases the torque acting on the armature body at this point and, on the other hand, relieves the bearing of some of the magnetic force produced. In the second region, the additional offset for example, the coil core advantageously overlaps radially more than half of the radial extent of the coil winding arranged circumferentially around the coil core.

In particular, in the second region, the coil core is configured in such a way that a centroid of the coil core is shifted in the opposite direction to the bearing device relative to the axis of symmetry.

According to one embodiment, the bearing device is arranged radially outside the coil core.

In one embodiment of the electromagnetic actuator, it is envisaged that the armature body has a first region, in which the armature body is supported in the actuator by the bearing device, and a second region, which extends over the second region of the coil core, wherein the armature body has a magnetic resistance per unit of length in the first region which is increased in relation to a magnetic resistance per unit of length in the second region of the armature body. It is thus possible, by increasing the magnetic resistance in the first region of the armature body, in which the bearing is situated, to additionally weaken the magnetic flux in the direction of the bearing, thereby allowing a further decrease in the loading on the bearing location.

According to one embodiment, it is envisaged that the armature body has at least one cross-sectional constriction in the first region in relation to a cross section in the second region of the armature body. In particular, the armature body has at least one cross-sectional constriction in the first region in relation to a cross section of an armature body material adjoining the cross-sectional constriction on the same side as the second region of the armature body. In this way, the magnetic resistance can be increased by comparatively simple production measures.

According to one embodiment, the at least one cross-sectional constriction has a reduced thickness of the armature body in relation to a thickness in the second region of the armature body.

In particular, according to one embodiment, the at least one cross-sectional constriction is produced by one or more reductions of the armature body material in the first region.

For example, the at least one cross-sectional constriction is produced by notching, stamping and/or punching out armature body material in the first region.

According to one embodiment, the at least one cross-sectional constriction is situated above a bearing axis of rotation of the bearing device and/or adjacent to the bearing axis of rotation of the bearing device. For example, a notch is provided in the region of the bearing axis of rotation. In addition or as an alternative, a selective reduction in the armature material (yoke), which may be in the region of the bearing, can be achieved by stamping, punching out or cutting.

According to one embodiment, the armature body is configured as a plate armature. The armature body can advantageously be configured as a tilting armature.

According to one embodiment, the electromagnetic actuator is configured as an electromagnetic switching or valve device and the movable armature body is configured as a switching or valve element.

In particular, the electromagnetic actuator is configured as an electromechanical relay or solenoid valve, in particular as a tilting armature valve.

According to one embodiment, the electromagnetic actuator is configured as a solenoid valve for a pressure control module in a vehicle.

The embodiments described herein can be used together or in any combination with one another.

The invention is explained in greater detail below by the figures shown in the drawing.

DETAILED DESCRIPTION

Figure 1A:
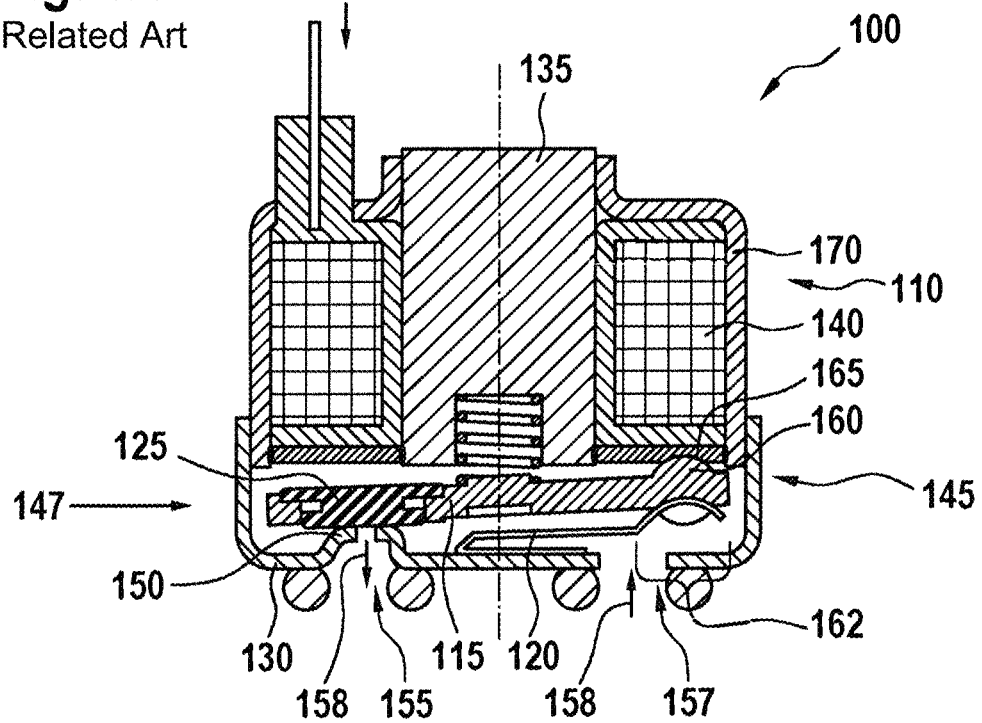
FIG. 1A shows a schematic cross-sectional illustration of an illustrative tilting armature valve, in which an electromagnetic actuator according to the invention as illustrated in FIG. 2 can be used in principle.
Figure 1B:
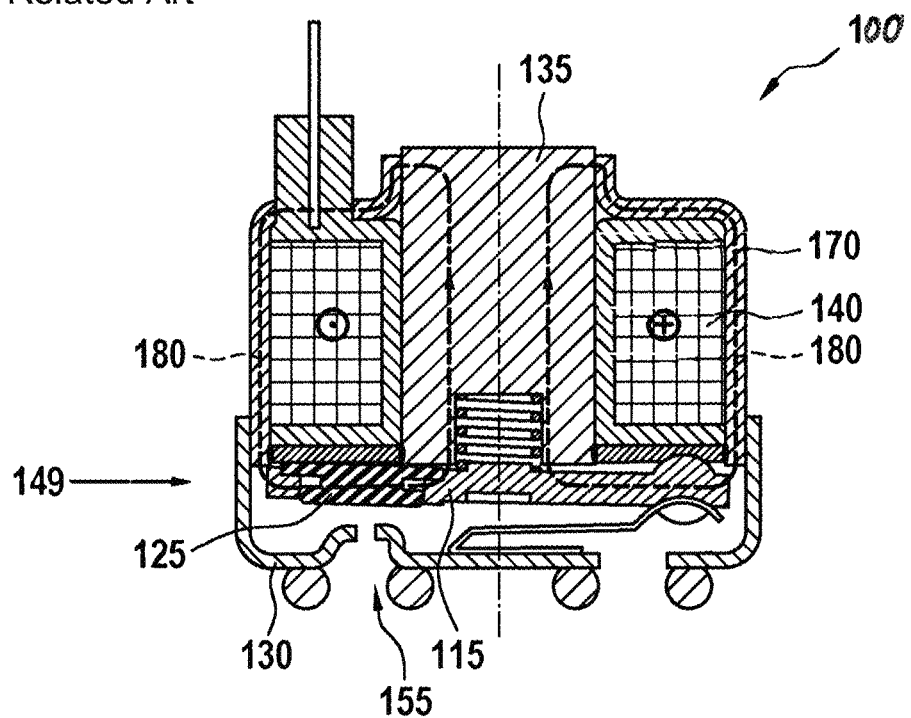
FIG. 1B shows a schematic cross-sectional illustration of an illustrative tilting armature valve, in which an electromagnetic actuator according to the invention as illustrated in FIG. 2 can be used in principle.
Figure 2:
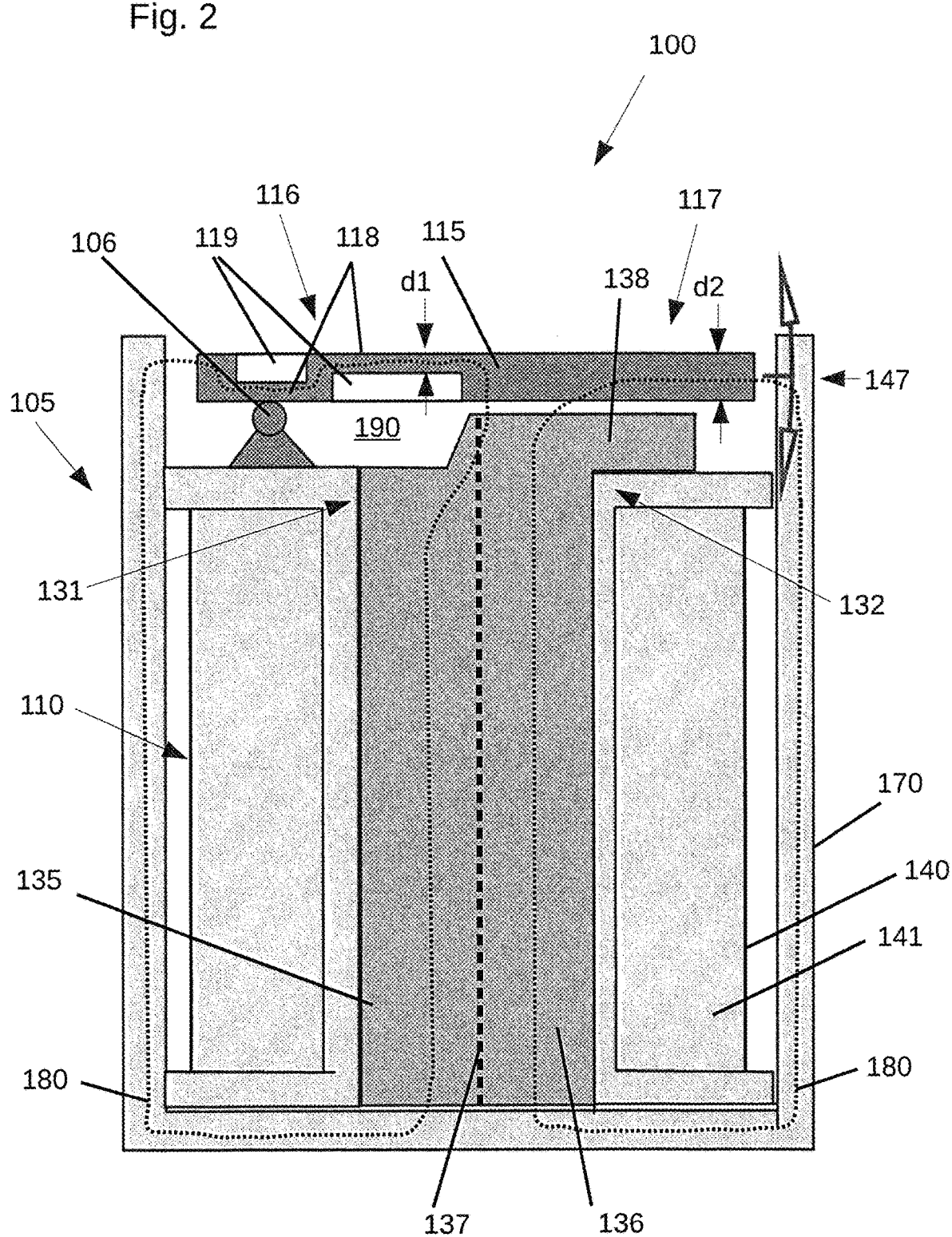
FIG. 2 shows a schematic cross-sectional illustration of one embodiment of an electromagnetic actuator according to the invention of the kind that can be used, for example, in a tilting armature valve according to FIG. 1.

FIG. 1 shows, by FIG. 1A and FIG. 1B, a simplified cross-sectional illustration of a tilting armature valve 100 according to one exemplary embodiment, in which an electromagnetic actuator according to the invention, of the kind illustrated in FIG. 2, can be used in principle. In this case, FIG. 1 is intended to illustrate an illustrative practical application of an electromagnetic actuator with reference to a tilting armature valve. The configuration according to the invention of the coil core, the armature body and other components is illustrated in greater detail, according to one exemplary embodiment, in FIG. 2 and, in principle, can readily be applied to a tilting armature valve according to FIG. 1 by a person skilled in the art. In this context, attention is drawn to the fact that the fundamental mode of operation of electromagnetic actuators, such as switching or valve devices having an armature body that can be moved by a magnetic field as a switching or valve element, is known to a person skilled in the art.

In principle, the tilting armature valve 100 can be an exemplary embodiment of a tilting armature valve 100 shown in DE 10 2016 105 532 A1. In one variant, this can be a solenoid valve provided with the reference sign 100 in FIG. 1 there. However, other exemplary embodiments are also conceivable, e.g. in connection with solenoid valves such as those described in the other publications mentioned above. Such embodiments of a solenoid valve described in DE 10 2016 105 532 A1 and the components thereof, and their use, are also incorporated by reference into the disclosure of the present invention.

FIG. 1A shows a cross section through a tilting armature valve 100 according to one exemplary embodiment, in which the armature is in the first position. The tilting armature valve 100 has a coil element 110, an armature body (or armature for short) 115, a spring 120, a sealing element 125, and a cover shell 130. In this case, the coil element 110 comprises at least one coil core 135 and a coil 140, which is arranged circumferentially around the coil core 135 and has a pack of coil windings (not illustrated explicitly). One end of the armature 115 is supported by a bearing 145. The armature 115 can be moved between a first position 147 and a second position 149. In this case, the armature 115 is configured to be moved from the first position 147 into a second (attracted) position 149 when the coil 140 is activated. When the coil 140 is activated, the armature 115 can be held in the second position 149. The sealing element 125 is furthermore arranged on the side of the armature 115 facing away from the coil element 110. A valve seat 150 having an outlet 155 and an inlet 157 for a fluid 158 is formed in the cover shell 130. In this case, the outlet 155 can be closed in a fluidtight manner by the sealing element 125 when the armature 115 is arranged in the first position 147. In this context, the sealing element 125 can furthermore also act as a damper element to prevent the armature 115 from banging into the valve seat 150. In this arrangement, the sealing element 125 can be secured on the armature 115 or a carrier element by vulcanization. It is furthermore conceivable for an angle to be formed by an oblique nozzle or an obliquely shaped sealing element 125 or a curved armature 115 when the armature 115 or sealing element 125 strikes the valve seat 150. Such a nozzle is not illustrated explicitly in FIG. 1A and does not necessarily have to be integrated into the tilting armature valve 100, but can also be provided by external housing parts.

It is furthermore conceivable that the valve seat 150 is arranged in the coil element 110, but this is not illustrated explicitly in FIG. 1A for reasons of clarity. In this case, an actuator that brought about exposure of the outlet by the armature 115 would be advantageous.

In this exemplary embodiment, the armature 115 has at least one at least partially round elevation 160 in a bearing section 162, wherein the elevation 160 advantageously engages in a recess 165 or opening, which is arranged in a section of a housing 170 of the tilting armature valve 100 which lies opposite the elevation 160. As a result, the armature 115 can slide in the recess during a movement from the first position 147 into the second position 149 after a flow of current through the coil 140 has been switched on, and it is simultaneously held at a fixed position in the housing 170 or in relation to the cover shell 130. The recess is advantageously of trapezoidal configuration, and therefore the minimum possible friction is caused as the elevation slides across the surface of the recess 165. The recess 165 can be manufactured from a plastics material, for example, and this enables it to be produced in a very simple and low-cost manner.

In this exemplary embodiment, the spring 120 is configured as a leaf spring and is arranged in the bearing section on an opposite side of the armature 115 from the coil 140. Here, the spring 120 serves to press the bearing ball(s), which (are) is press-fitted in the armature 115 for example, without play into the (e.g. trapezoidal) mating shell or recess 165 in the housing 170 of the coil element 110. The armature 115 can be fixed by the spring 120, thus ensuring that the armature 115 is held in a predetermined position by the spring 120. This offers the advantage that a constant preloading force can be exerted on the armature 115, and the force exerted on the armature 115 by the spring 120 can be introduced into the armature 115 as close as possible to a point of action of the force situated at the axis of rotation.

Alternatively, it is also possible for the armature 115 to be hooked into the coil element 110. In this case, the spring 120, which is configured as a leaf spring for example, could then be omitted.

FIG. 1B shows a cross section through a tilting armature valve 100, in which the armature 115 is in the second position 149. In this case, a current through the coil 140 is switched on, and the armature 115 is attracted, with the result that a magnetic field illustrated by the field lines 180 is built up. When the current through the coil 140 is switched off, the armature 115 can fall back into the first position 147 owing to gravity or a spring force of the illustrated return spring, for example.

However, the core shape of the cylindrically shaped coil core 135, as shown in FIG. 1, causes the transition of the magnetic flux (illustrated by way of example by the field lines 180) from the magnet core to the yoke to take place in a nonuniform way. In the case of use in yoke armature magnets or tilting armature magnets, as in FIG. 1, this means however that a significant proportion of the effective magnetic force also acts in the region of the bearing section 162 of the armature 115. As a result, the effective magnetic force on the same side as the sealing element 125 is reduced or even weakened and, furthermore, the bearing section 162 is also additionally acted upon by magnetic forces, something that is not desired in many actuator configurations.

FIG. 2 shows a schematic cross-sectional illustration of one embodiment of an electromagnetic actuator according to the invention of the kind that can be used, for example, in a tilting armature valve according to FIG. 1. Components that are the same, have the same action or are similar are denoted by the same reference signs in FIGS. 1 and 2.

In contrast to the tilting armature valve 100 according to FIG. 1, the electromagnetic actuator 105 according to FIG. 2 has a coil element 110 in which the coil core 135 has a rotationally symmetrical first region 136 with an axis of symmetry 137, in which the coil core 135 is surrounded circumferentially by the coil 140, and a second region 138, which extends radially beyond the first region 136, that is to say has a radial extent, at least on one side of the coil core 135, which goes beyond the radial extent of the first region 136. In the first region 136, the coil core is thus formed cylindrically, for example, around the axis of symmetry 137, similarly to the coil core 135 according to FIG. 1, but this is not the case in the second region 138.

In contrast to FIG. 1, therefore, the invention additionally provides a second region 138 of the coil core 135 which is asymmetrical with respect to the axis of symmetry 137 to influence the magnetic field in an asymmetric way. In particular, when viewed in cross section along the axis of symmetry 137 of the coil core 135, starting from the first region 136, the second region 138 of the coil core 135 is formed in the manner of an offset over substantially half of the rotationally symmetrical (cylindrical) region 136. In this case, in plan view, the second region 138 can be of rectangular or partly round, e.g. semicircular, configuration or can be configured with some other geometrical shape, e.g. with a geometrical shape (e.g. semicircular) which corresponds in plan view to the geometrical shape of the armature 115 (e.g. rounded or semicircular in region 117). Consequently, a side of the coil core 135 that is remote from the armature bearing is provided in the second region 138 with an additional offset which deviates from the cylindrical shape of the first region 136 and which advantageously extends to a maximum possible diameter as far as or close to the outer circumference of the coil winding 141.

The armature 115 is supported on one side in the actuator 105 by the bearing device 106. In the embodiment under consideration, the bearing device 106 is arranged radially offset from the axis of symmetry 137 of the coil core 135 and is fixed in the actuator 105, which may be radially to the outside of the coil core 135 or to the outside of the circumference thereof, e.g. on the coil element 110. In this arrangement, the armature 115 extends radially from the bearing device 106 across the coil core 135 from a first side 131 to a second side 132 of the coil core 135. In this case, the second side 132 is situated radially opposite the first side 131.

As described with reference to FIG. 1, the armature 115 is moved from the first position 147 (which can be horizontal or slightly raised, as shown in FIG. 1A) into the second, attracted, position (similar to position 149 in FIG. 1B; not illustrated in FIG. 2) by activating the coil element 110 (current flow in the coil 140), and is consequently pulled downward against the coil 140.

The second region 138 of the coil core 135, which extends radially and asymmetrically beyond the first region 136, is arranged on the second side 132 of the coil core 135, between the coil 140 and the armature body 115, when viewed in the direction of the axis of symmetry 137. An air gap 190 is therefore formed between the coil core 135 and the armature 115 in the direction of the axis of symmetry 137 (and consequently in the longitudinal direction of the coil core 135), said gap being formed asymmetrically between the first side 131 and the second side 132 of the coil core 135. In particular, in the first position 147 of the armature 115, the air gap 190 is smaller on the second side 132 of the coil core than on the first side 131 between the coil core 135 and the armature 115 in the direction of the axis of symmetry 137. This means that the magnetic resistance (Rm) for the magnetic field lines 180 is lower on the second side 132 than on the first side 131:

$$Rm = Rm,\text{iron} + Rm,\text{air}.$$

In this context, "iron" is intended to include the armature material and the material of the coil core 135 and that of the housing 170. Here, these components can be composed of the same or of different magnetically conductive materials.

Since the magnetic resistance Rm is proportional to the length which the field lines 180 have to pass through, Rm, air is lower on the second side 132 on account of the offset of the coil core 135 in the second region 138 and the resulting reduction in the air gap 190 than on the first side 131, on which the air gap 190 is significantly larger in comparison.

As a result of an additional offset of this kind in the second region 138, the field lines 180 of the magnetic field are therefore directed to a greater extent in the direction of the second side 132 of the coil core 135, which, on the one hand, increases the torque acting on the armature 115 at this point and, on the other hand, relieves the bearing device 106 of some of the magnetic force produced. In the second region 138, that is to say the illustrated additional offset, the coil core 135 advantageously radially overlaps more than half of the radial extent of the coil winding 141 arranged circumferentially around the coil core 135. In principle, the additional offset or head of the coil core 135 in the second region 138 can be formed as far as or nearly as far as the housing 170. However, even a relatively small radial extent of the offset into the radial region of the coil winding 141 can lead to an improvement in field line distribution. In the second region 138, the coil core 135 is advantageously configured in such a way that a centroid of the coil core 135 is shifted in the opposite direction to the bearing device 106 relative to the axis of symmetry 137.

The invention thus makes it possible to increase the magnetic force that can be used for the movement of the armature 115 which is to be activated since the magnetic transition between the coil core 135 and the armature 115 is configured in such a way that, on the one hand, the magnetic flux in the direction of the bearing device 106 is weakened by a larger air gap 190, whereas the usable magnetic force is increased on the opposite side of the armature 115. This also has a positive effect on the torque which acts on the armature 115 as a result of the magnetic force, the torque being increased on the second side 132 of the coil core 135, remote from the bearing device 106, since the field lines 180 and therefore the central point of the force is shifted in the direction of the second side 132 to a larger radius of the armature 115. This also has the positive effect that the magnetic forces additionally acting on the bearing device 106 are reduced.

The shifting of the field lines 180 in the direction of the second side 132 of the coil core 135 can be increased if the armature 115 has a higher magnetic resistance per unit of length in the first region 116 in relation to a magnetic resistance per unit of length in a second region 117 of the armature 115. In the first region 116, the armature 115 is supported in the actuator 105 by the bearing device 106, and the armature 115 extends over the second region 138 of the coil core 135 in the second region 117. Consequently, the magnetic resistance per unit of length is higher in the vicinity of the bearing than in the region of the offset of the coil core 135. By this means too, the field lines 180 can be shifted in the direction of the second side 132 to a larger radius of the armature 115.

The magnetic resistance per unit of length can be increased if at least one cross-sectional constriction 118 in relation to a cross section in the second region 117 of the armature 115 is provided in the first region 116 of the armature 115. Since the magnetic resistance Rm is inversely proportional to the cross-sectional area of the armature material which the field lines 180 must pass through, Rm, iron per unit of length is higher in the first region 116 of the armature 115 than in the second region 117 on account of the cross-sectional constriction(s) 118. Moreover, as illustrated in FIG. 2, offset positioning of the cross-sectional constrictions 118 enables the path that the field lines 180 have to traverse to be extended by curves brought about in this way, and this in turn increases the magnetic resistance, which is proportional to the length traversed.

As illustrated in FIG. 2, the respective cross section of the armature 115 in the cross-sectional constrictions 118 is reduced in relation to a cross section of the armature body material adjoining the cross-sectional constrictions 118 on the same side as the second region 117.

In the embodiment according to FIG. 2, the cross-sectional constriction(s) 118 has (have) a smaller thickness d1 of the armature 115 (in the direction of the axis of symmetry 137) in relation to the thickness d2 in the second region 117 of the armature 115.

The cross-sectional constriction(s) 118 can be produced by a reduction (indicated by 119 in FIG. 2) of the armature body material in the first region 116. The reduction 119 (e.g. in the form of a hollow, an indentation or a depression) is produced by notching, stamping and/or punching out armature body material, for example. It is advantageous if a cross-sectional constriction 118 is arranged above the bearing axis of rotation of the bearing device 106 and/or adjacent to the bearing axis of rotation of the bearing device 106, as shown in FIG. 2.

By selective positioning and configuration of the magnetic transition between the magnet core and the armature (yoke), the magnetic flux is thus advantageously weakened in the direction of the bearing. Moreover, the usable magnetic force can be increased, and the bearing force can be reduced, resulting in lower bearing friction.

In the embodiment illustrated, as in the embodiment according to FIG. 1, the armature 115 is configured as a plate armature, such as that used, for example, in a tilting armature valve 100 according to FIG. 1. On one side, in the exemplary embodiment under consideration, at the end, the armature 115 is fixed and supported in the actuator 105, e.g. the tilting armature valve 100, by the bearing device 106, and is moved between the first and second positions by activating the coil 140, as described with reference to FIG. 1. In FIG. 2, the bearing device 106 with the bearing axis of rotation perpendicular to the axis of symmetry 137 of the coil core 135 is illustrated differently from the bearing section 162 and bearing 145 in FIG. 1 and is intended to illustrate support for the armature 115 at one end in a purely schematic way. Various mechanisms can be used for bearing support, e.g. that in FIG. 1 or other mechanisms in the abovementioned publications.

The actuator 105 according to FIG. 2 has been described in consideration of FIG. 1 in the context of a solenoid valve in the form of the tilting armature valve 100. If used in an electromagnetic switching device, e.g. a relay, on the other hand, the armature 115 shown in FIG. 2 could be used, for example, as an electric switching element which closes or opens an electric contact in a manner similar to a valve opening. In principle, the described manner of shifting the magnetic field by the configuration of the coil core 135 and of the armature 115 can be used with all electromagnetic armature valve devices and switching devices of the type in question.

THE LIST OF REFERENCE SIGNS IS AS FOLLOWS

100 tilting armature valve
105 electromagnetic actuator
106 bearing device
110 coil element
115 armature body
116 first region
117 second region
118 cross-sectional constriction
119 reduction
120 spring
125 sealing element
130 housing part
131 first side
132 second side
135 coil core
136 first region
137 axis of symmetry
138 second region
140 coil
141 coil winding
145 bearing
147 first position
149 second position
150 valve seat
155 outlet
157 inlet
158 fluid
160 elevation
162 bearing section
165 recess
170 housing
180 field lines

The invention claimed is:

1. An electromagnetic actuator, comprising:
a coil element, which has at least one coil core and a coil arranged circumferentially around the coil core, wherein the coil core has a rotationally symmetrical first region, which has an axis of symmetry and in which the coil core is surrounded circumferentially by the coil;
a movable magnetic armature body configured as a movable actuator element, which interacts with the coil element to produce a movement, to be activated, of the armature body, and which is supported in the actuator on one side by a bearing device, and can be moved from a first position into a second position by activating the coil element, wherein the bearing device is arranged radially offset relative to the axis of symmetry of the coil core, and the armature body extends from the bearing device radially over the coil core from a first side to a second side of the coil core;
wherein the coil core has a second region, which extends radially beyond the first region and which is arranged on the second side of the coil core between the coil and the armature body in the direction of axis of symmetry, such that an air gap between the coil core and the armature body in the direction of the axis of symmetry is smaller on the second side of the coil core than on the first side when the armature body is in the first position;
wherein the armature body has a first region, in which the armature body is supported in the actuator by means of the bearing device, and a second region, which extends over the second region of the coil core, and wherein the armature body has a magnetic resistance per unit of length in the first region which is increased in relation to a magnetic resistance per unit of length in the second region of the armature body.

2. The electromagnetic actuator of claim 1, wherein, when viewed in cross section along the axis of symmetry of the coil core, the second region of the coil core extends in the manner of an offset, starting from the first region.

3. The electromagnetic actuator of claim 1, wherein the bearing device is arranged radially outside the coil core.

4. The electromagnetic actuator of claim 1, wherein the coil has a coil winding which is arranged circumferentially around the coil core, and the coil core is configured so that in the second region that a centroid of the coil core is shifted in the opposite direction to the bearing device relative to the axis of symmetry.

5. The electromagnetic actuator of claim 1, wherein the armature body has at least one cross-sectional constriction in the first region in relation to a cross section in the second region of the armature body.

6. The electromagnetic actuator of claim 1, wherein the armature body has at least one cross-sectional constriction in the first region in relation to a cross section of an armature body material adjoining the cross-sectional constriction on the same side as the second region of the armature body.

7. The electromagnetic actuator of claim 5, wherein the at least one cross-sectional constriction has a reduced thickness of the armature body in relation to a thickness in the second region of the armature body.

8. The electromagnetic actuator of claim 5, wherein the at least one cross-sectional constriction is produced by a reduction of an armature body material in the first region.

9. The electromagnetic actuator of claim 5, wherein the at least one cross-sectional constriction is produced by notching, stamping and/or punching out armature body material in the first region.

10. The electromagnetic actuator of claim 5, wherein the at least one cross-sectional constriction is situated above a bearing axis of rotation of the bearing device and/or adjacent to the bearing axis of rotation of the bearing device.

11. The electromagnetic actuator of claim 1, wherein the armature body is configured as a plate armature.

12. The electromagnetic actuator of claim 1, wherein the armature body is configured as a tilting armature.

13. The electromagnetic actuator of claim 1, wherein the electromagnetic actuator is configured as an electromagnetic switching or valve device and the movable armature body is configured as a switching or valve element.

14. The electromagnetic actuator of claim 13, wherein the electromagnetic actuator is configured as an electromechanical relay or solenoid valve.

15. The electromagnetic actuator of claim 14, wherein the electromagnetic actuator is configured as a solenoid valve for a pressure control module in a vehicle.

* * * * *